March 18, 1969  K. D. IVES ET AL  3,433,060
STRAIN GAGE TRANSDUCER ASSEMBLY
Filed July 26, 1966
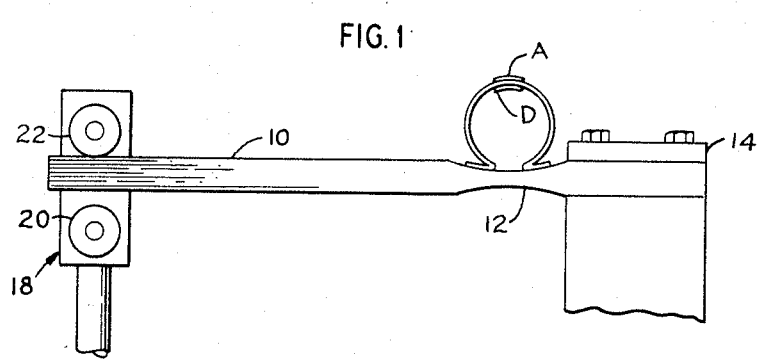
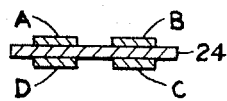
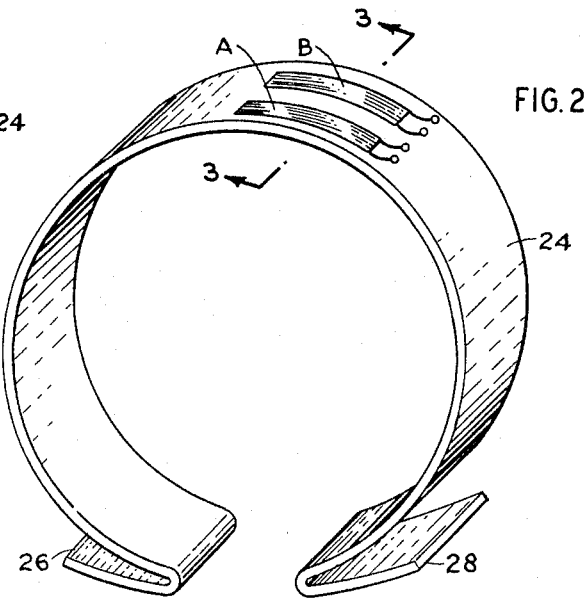
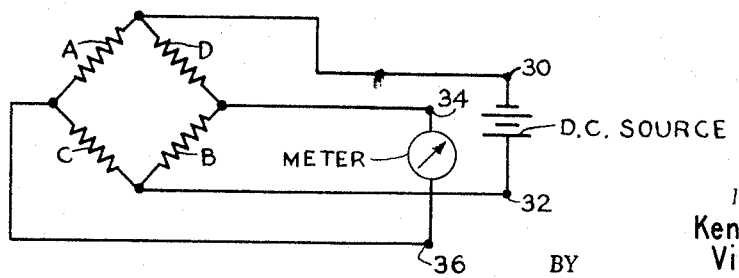
INVENTORS
Kenneth D. Ives
Vijay Rastogi
BY
ATTORNEY 3,433,060
STRAIN GAGE TRANSDUCER ASSEMBLY
Kenneth D. Ives and Vijay Rastogi, Alliance, Ohio, assignors to The Babcock & Wilcox Company, New York, N.Y., a corporation of New Jersey
Filed July 26, 1966, Ser. No. 568,011
U.S. Cl. 73—88.5                8 Claims
Int. Cl. G01n 7/22

ABSTRACT OF THE DISCLOSURE

A transducer assembly for measuring variations in strain of a cyclically loaded test specimen and determining failure of the test specimen due to fatigue. The apparatus comprises in combination, a cantilever test specimen having a waist portion between its ends, an arcuately curved member with its ends welded to the test specimen at its waist portion, a resistance strain gage attached to the curved member, and means for measuring variations in electrical resistance of the strain gage and determining failure of the specimen due to fatigue.

Background and summary of the invention

This invention relates to devices for measuring material properties, and more particularly to a strain gage-transducer assembly for use in accurately measuring the strain induced in a specimen as a result of applied loading.

Bonded wire resistance strain gages are commonly used to measure stresses and strains produced in a specimen under load. This type of gage essentially consists of a fine wire or a metallic grid which, according to conventional practice, is suitably cemented or otherwise bonded to the specimen. As the specimen is strained, the wires of the grid undergo similar strains which produce a change in the cross section of the wire. This change in cross section results in a change in electrical resistance of the wire that is proportional to the amount of strain imposed and can be readily measured. In this way, mechanical strain of a specimen can be accurately measured by electrical means.

The present invention copes with the problem of premature failures of strain gages, especially premature failures that are attributable to service at high strain levels in a high temperature environment. It will be appreciated that such premature failures can disrupt a test program or cast doubt on the dependability of its results, and in any event cause a loss of time, effort and materials.

The present invention involves the recognition that strain gages can give extended service in a high temperature environment if operated at lower strain levels while nevertheless measuring high strain levels in the specimen. To this end, it is proposed to transmit strain from the specimen to one or more strain gages by means of a unique mechanical transducer formed as an arcuately bent strip of resilient material and having its free end portions bonded, as by welding, to that portion of the specimen where strain is to be measured. The free ends of the transducer are aligned in the direction of strain measurement and the wire resistance strain gages are cemented to the transducer intermediate, and preferably midway between, its free ends.

Because it has a constant radius, arcuate shape, the transducer linearly and proportionally translates high strain of the specimen into relatively low strain of the gage wires. Thus, variations in electrical resistance of the strain gages are linearily proportional to variations in strain of the specimen. And, since strain gages can operate without failure in a high temperature environment for longer periods at low strain levels than at high strain levels, the useful life of the strain gage is extended and the risk of premature gage failure is virtually eliminated.

Brief description of the drawings

FIG. 1 is an elevational view of a test assembly incorporating the transducer assembly of the present invention;

FIG. 2 is a perspective view on an enlarged scale of the transducer assembly of FIG. 1;

FIG. 3 is a sectional view through the transducer assembly of FIG. 2, taken along lines 3—3 thereof;

FIG. 4 is a diagram of the electrical circuitry employed for the strain gages in the transducer assembly.

Description of the preferred embodiments

As shown in FIG. 1, a cantilever beam test specimen 10 has a waist portion 12 intermediate the ends thereof, but preferably closest to the end thereof to be clamped. This type of specimen gives a uniaxial stress distribution at the waist portion 12. As shown, the specimen 10 extends horizontally, and the end thereof closest to the waist portion 12 is tightly clamped in a vise 14 of test apparatus. The latter may be of the kind disclosed in our copending application for U.S. patent, now U.S. Pat. No. 3,381,526, filed May 10, 1965.

Bending forces are applied to the free end of the specimen 10 by a vertically reciprocating member 18 having a pair of vertically spaced rollers 20 and 22 which are engageable one at a time with the specimen. For example, the bottom roller 20 engages the free end of the specimen 10 to deflect the latter upwardly and the top roller 22 bears against the specimen to produce downward deflection. By providing for clearance between at least one of the rollers and the specimen 10, the specimen is deflected as a free cantilever rather than as a guided cantilever.

The transducer assembly comprises a mechanical transducer 24 and one or more strain gages, preferably four of them as shown, designated by the letters A, B, C and D. The mechanical transducer 24 is preferably made from a length of resilient material, such as stainless steel, of uniform cross section. The cross-sectional configuration of the transducer 24 shown in the drawing is rectangular, and the main portion thereof is formed lengthwise to have an arcuate shape of constant radius and an arcuate length which is slightly less than the full circumference of a corresponding developed cylinder. For convenience in securing the transducer 24 to the specimen, as by spot welding, outwardly and reversely bent tabs 26 and 28 may be provided at the free ends of the transducer 24. Thus, the mechanical transducer 24 is generally of "omega" shape ($\Omega$), although it should be understood that the invention can be practiced by providing a mechanical transducer 24 as aforesaid in which the tabs 26 and 28 are either omitted or shaped somewhat differently.

The ratio at which strain is translated from the specimen to the gage is a function of the thickness, width, radius of curvature, arcuate length, and modulus of elasticity of the transducer 24, so that this translation ratio can be varied by suitable changes of dimension or material.

Two of the gages A and B are bonded to the upper or outer surface of the transducer 24 and the other two gages C and D are bonded to the lower or inner surface thereof, as shown, preferably with ceramic cement. The gages A, B, C and D are connected in a bridge circuit as shown in FIG. 4 to be energized with D.C. current applied to the input terminals 30 and 32 and measured, as by a voltmeter connected across output signal terminals 34 and 36.

This arrangement minimizes the adverse effect of high temperature because the circuit is self-compensating and it lends itself to easy calibration for measuring strain without imposing large strains on the gages.

It is a feature of the present invention that an assembly of the type described herein may be used over and over again because, unlike older arrangements in which the gage is bonded directly to the specimen, the assembly can be removed after completion of the test and salvaged. The assembly disclosed herein can be used at one or more temperatures, and it has been found especially effective for extended service in low-cycle high-temperature mechanical fatigue testing of cantilever beam specimens.

The strain gage transducer assembly of the present invention has been applied to specimens undergoing tests in a high-temperature mechanical fatigue testing machine of the type shown and described in the previously cited patent application, with high loads being applied to cause failure within 100,000 cycles. In such testing, the accurate determination of failure of the specimen depends in no small measure on the ability to accurately measure at least to 5% strain at 1200° F. Although presently available strain gages can measure 10% strain produced by static loads at room temperature, it has been found that room temperature gages cannot withstand more than 4% maximum strain under cyclic loading and, with strain gages conventionally cemented directly to the specimen with brittle ceramic cement for use at high temperatures. Under cyclic loading conditions, the life expectancy of a strain gage-specimen assembly is substantially decreased, because the brittle ceramic cements are unable to endure more than 0.8 to 1.5% strain at temperatures of 800° F. to 1000° F.

For strain measurements at room temperature, Type EP–08–215 AD gages are preferably applied to the transducer with contact cement; but for temperatures up to 600° F. Type SK–06–125 AD gages are preferably applied with Type BR 600 cement; and, as mentioned previously, for high temperature applications above 600° F., Nichrome-V foil gages are preferably applied with Type H ceramic cement.

With the strain gage-transducer assembly of the present invention, the maximum strain capability of the strain gages and cements was found in actual use to be increased far beyond that required for cyclic loading at 1200° F. In such actual use, four Nichrome-V high temperature strain gages were mounted on the surface of the transducer 24, as shown in the drawings, with Type H ceramic cement to provide a full four gage bridge circuit for high temperature use. With this arrangement, the output signal strength is four times the output signal strength of a single gage on the transducer, and it has the added advantage of minimizing such undesirable high temperature effects as apparent strain and drift. Also, with tabs 26 and 28 of the arcuate transducer 24 welded directly to the waist portion 12 of the specimen 10, as shown, the transduction of strain from the surface of the specimen to the strain gages is both directly proportional and linear.

In accordance with the foregoing a transducer assembly for measuring strain of a specimen may comprise an elongated member formed to have free end portions adapted to be secured to the specimen, the member being curved lengthwise into an arcuate shape, and a wire resistance strain gage attached to the member intermediate the end portions. In at least one embodiment, the wire resistance strain gage is preferably attached to the member midway between the end portions along the curved length thereof, and the member preferably has a lengthwise curvature of constant radius and is of uniform transverse cross-section. The transducer assembly in another embodiment is used in combination with an elongated test specimen with means for clamping at least one end thereof and applying a load to the specimen for producing longitudinal strain in the specimen at a first location adjacent the clamped end thereof, the end portions of the transducer member being spaced apart in longitudinal direction with respect to the specimen and being rigidly bonded to the specimen at the first location on the specimen for movement of the end portions therewith, and means for measuring variations in electrical resistance of the strain gage.

What is claimed is:

1. A transducer assembly for measuring strain of a cyclically loaded test specimen undergoing a fatigue test comprising, in combination:
   (a) a cantilever test specimen having a waist portion intermediate the ends thereof,
   (b) means for clamping one end of the test specimen and cyclically applying bending forces to the free end thereof for producing strain in the test specimen at the waist portion,
   (c) an elongated arcuately curved member having free end portions directly connected to the test specimen at the waist portion,
   (d) an electrical resistance strain gage attached to the member intermediate the end portions of the member to detect a change in deflection of the test specimen at the waist portion, and
   (e) means for measuring variations in electrical resistance of the strain gage.

2. A transducer assembly according to claim 1 wherein said member has a lengthwise curvature of constant radius.

3. A transducer assembly according to claim 1 wherein said elongated member is of uniform transverse cross section.

4. A transducer assembly according to claim 1 wherein said wire resistance strain gage is attached to said member by cement.

5. A transducer assembly according to claim 2 wherein said wire resistance strain gage is attached to said member midway between said end portions along the curved length thereof.

6. A transducer assembly according to claim 2 wherein said elongated member is of uniform transverse cross section.

7. A transducer assembly according to claim 5 wherein said member is of uniform transverse cross section.

8. The combination according to claim 1 wherein the end portions of the curved member are removably welded to the test specimen.

References Cited

UNITED STATES PATENTS

| | | | |
|---|---|---|---|
| 2,815,424 | 12/1957 | Painter | 201—63 |
| 3,134,256 | 5/1964 | Wolstenholme | 73—15.6 |
| 3,170,321 | 2/1965 | Sullivan et al. | 73—100 |
| 3,323,092 | 5/1967 | Balazs et al. | 338—6 |
| 3,035,223 | 5/1962 | Schantz | 323—75 |
| 2,612,774 | 10/1952 | Zener et al. | 73—89 |

RICHARD C. QUEISSER, *Primary Examiner.*

VICTOR J. TOTH, *Assistant Examiner.*

U.S. Cl. X.R.

73—67.3; 235—183; 338—6